April 21, 1925.
E. J. REBECHINI
1,534,188
BLANCHING MACHINE
Filed March 3, 1924     4 Sheets-Sheet 1
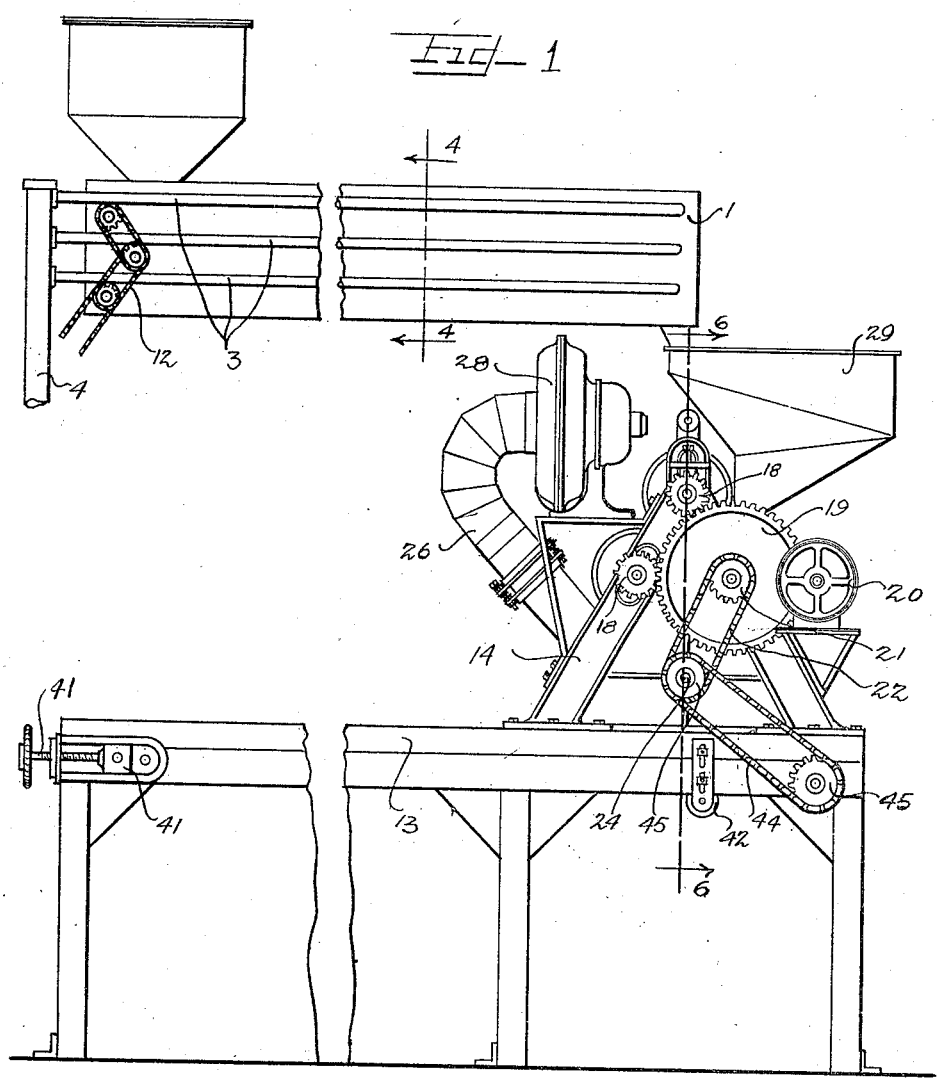

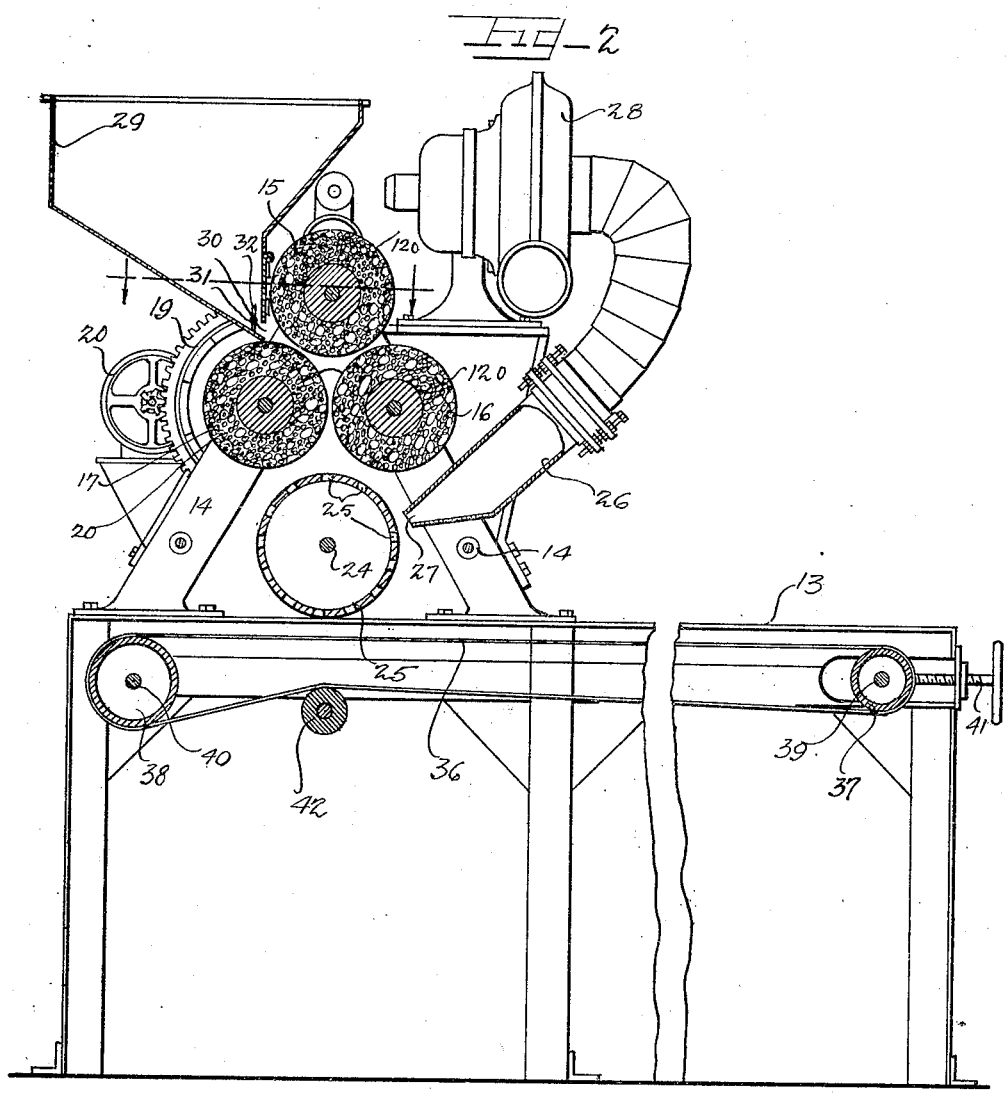

April 21, 1925.  E. J. REBECHINI  1,534,188
BLANCHING MACHINE
Filed March 3, 1924  4 Sheets-Sheet 3
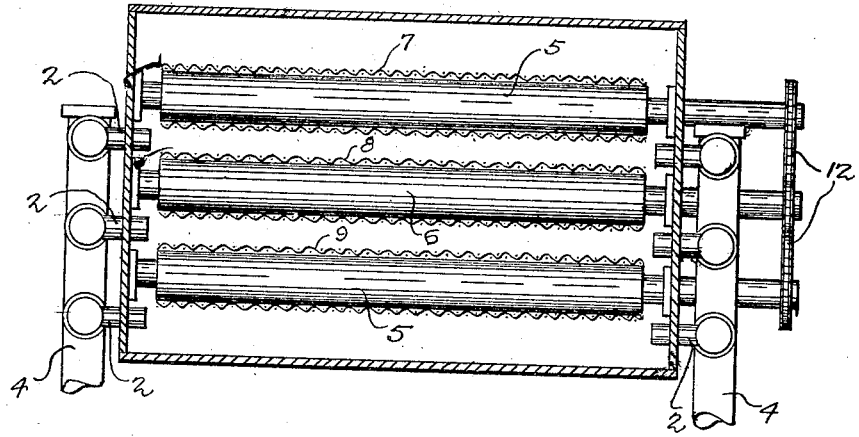
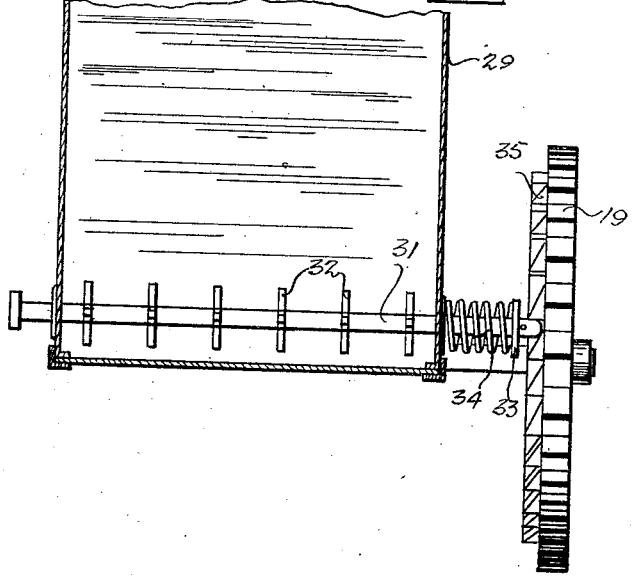
Inventor
Eugene J. Rebechini April 21, 1925.
E. J. REBECHINI
1,534,188
BLANCHING MACHINE
Filed March 3, 1924 4 Sheets-Sheet 4
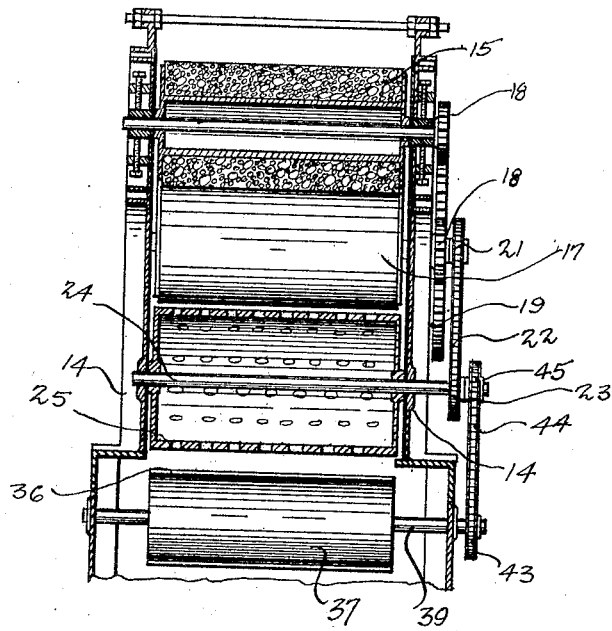
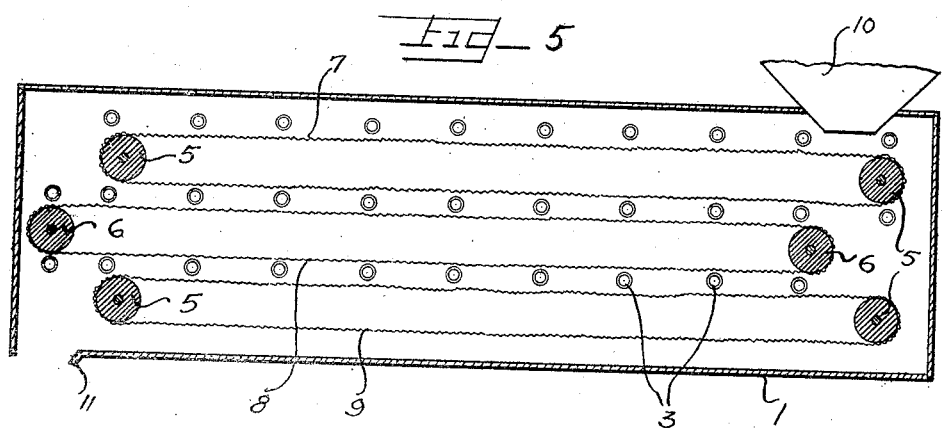
Inventor
Eugene J. Rebechini Patented Apr. 21, 1925.

1,534,188

UNITED STATES PATENT OFFICE.

EUGENE J. REBECHINI, OF CHICAGO, ILLINOIS.

BLANCHING MACHINE.

Application filed March 3, 1924. Serial No. 696,413.

*To all whom it may concern:*

Be it known that I, EUGENE J. REBECHINI, a subject of the King of Italy (who has declared his intention of becoming a citizen of the United States), and a resident of the city of Chicago, in the county of Cook and State of Illinois, have invented certain new and useful Improvements in Blanching Machines; and I hereby declare that the following is a full, clear, and exact description of the same, reference being had to the accompanying drawings, and to the numerals of reference marked thereon, which form a part of this specification.

This invention relates to a blanching machine, which is designed for removing the skins from shelled nuts or the like.

It is an object of this invention to provide a machine in which the shelled nuts properly treated may be passed for removing the skins therefrom by a rubbing action and in which a draft of air may be utilized for separating the skins from the nuts and exhausting the same from the machine.

It is also an object of this invention to provide in connection with such a machine, mechanism for treating the nuts for loosening the skins thereof.

The invention comprises the novel structure and combinations hereinafter described and more particularly pointed out and defined in the appended claims.

In the accompanying drawings which illustrate a preferred embodiment of this invention and in which similar reference numerals refer to similar features in the different views:

Figure 1 is an elevational view of the blanching mechanism including mechanism for treating the same for loosening the skins.

Figure 2 is an enlarged part sectional and part elevational view of the nut blanching machine.

Figure 3 is an enlarged sectional view through the hopper of the blanching machine, showing the nut agitator and operating mechanism therefor in elevation.

Figure 4 is an enlarged transverse sectional view through the nut treating machine.

Figure 5 is an enlarged longitudinal sectional view through the nut treating machine.

Figure 6 is a sectional view upon the line 6—6 of Figure 2 with parts in elevation.

Referring to the drawings, it will be observed with reference to Fig. 1, that the shelled nuts or kernels are first put into a nut treating chamber, represented by the numeral 1, in order to loosen their skins. Certain classes of nuts such as peanuts must be roasted to loosen the skins, others such as almonds have to be steamed. In the present instance, the chamber 1 is constructed for steaming nuts; the nuts being conveyed in a sinuous path through said chamber and fed into the blanching machine therefrom.

The nut treating chamber consists of a closed box-like structure into the opposite sides of which the nozzles 2 of steam pipes 3 extend for supplying steam to the chamber. These pipes may connect with a main steam pipe 4.

Within the chamber, near each end thereof are journalled a plurality of rollers 5 and 6. The vertical planes of the axis of the rollers 5 are in the same vertical plane while the rollers 6 lie in a horizontal plane intermediate the rollers 5 and are offset from the vertical plane of said rollers, for a purpose that will presently appear. An endless screen conveyer 7 is trained over the upper rolls 5, a similar conveyer 8 is trained over the rolls 6, and a similar conveyer 9 is trained over the lower rolls 5. A hopper 10 is positioned adjacent one end of the top of the chamber 1 and a discharge chute 11 is positioned at the bottom of the opposite end thereof. The shafts of these rolls at one end of the chamber extend outwardly beyond the side wall where they are equipped with gearing 12 for rotating the same.

It will be noted that as the shelled nuts are deposited in the hopper 10, they will descend upon the conveyer 7 and be carried to the left hand end of the chamber, and over the upper left hand roller 5, from whence they will fall upon the conveyer 8 and be carried to the right hand end over them to the left hand end of the chamber and over the lower left end roller from which the steamed nuts will drop through the chute 11 into the blanching machine. The offset feature of the intermediate rollers 5 allows the nuts to drop by gravity from one conveyer to the other. Thus the nuts are caused to follow a sinuous path through the steam chamber so that they will be sufficiently steamed to have their skins thoroughly loosened.

The blanching machine illustrated comprises a suitable bench or support 13 from which a pair of spaced triangular frame members 14 rise. Three rollers 15, 16 and 17 are suitably journalled between these frame members. The peripheries of these rollers are formed of some spongy or yielding material as spongy rubber. The peripheries of these rollers are sufficiently spaced apart to allow the nuts to pass therebetween and they rotate at different velocities so that a rubbing action is obtained for rubbing the skins from the nuts. The shafts of these rolls extend at one end through the triangular frame, for the attachment of gears (Fig. 1). The shafts of the rolls 15 and 16 have small spur gears 18 thereon while the shaft of the roll 17 has a large spur gear 19 thereon having a ratio of about 20 revolution to 120 revolution of the other gears. The gear 19 is driven by a motor 20 or the like and drives the gears 18.

A small sprocket wheel 21 is secured upon the end of the shaft of the roller 17, a sprocket chain 22 operatively connects the sprocket gear 21 with a sprocket gear 23 secured upon the end of a shaft 24 journalled in the frame members 14 and supporting a perforated roller 25 over which the skinned nuts are adapted to roll and be spread or separated.

A suction pipe 26 having a restricted opening 27 adjacent the periphery of the roller 25 extends upwardly to a blower or exhaust pump 28 supported upon a bracket extending from the frame 14. This exhaust pump will create a suction adjacent the roller 25 and exhaust the skins of the nuts or other waste matter; the perforation in the roller increasing the suction.

A hopper 29 is suitably supported for receiving the nuts from the nut treating chamber 1. This hopper has a restricted feed outlet 30 directed between the rolls 15 and 17. An agitator 31 extends along this feed outlet 20. The agitator is best shown in Fig. 3, and comprises a bar journalled in the ends of the hopper and provided at intervals with agitating fingers 32. The inner end of the agitator extends through the wall of the hopper and is provided with a disk 33 spaced from the hopper. A coil spring 34 is confined between said collar and the hopper and is effective for normally projecting the end of the agitator in operative relation with sloping cams 35 extending in a circumferential direction upon the inner side of the spur gear 19. It will be evident that as the gear 19 rotates, it will cause the agitator to reciprocate according to the crests and depressions of the cams 35.

The skinned nuts after passing between the rubbing rolls, fall by gravity upon a conveyer 36 which consists of an endless belt trained over a pair of pulleys or rollers 37 and 38 secured upon shafts 39 and 40 journalled in the sides of the bench 13. The shaft 39 is mounted in adjustable journal boxes 41 (Fig. 1) which may be adjusted through the operation of a screw rod 41 connected to said blocks and threaded in a nut or the like upon the bench for adjusting the belt. A tension roller 42 may be supported beneath the belt 36 for maintaining the same in proper tension. A sprocket gear 43 secured upon the end of the shaft 39 is geared by means of a sprocket chain 44 to a sprocket gear 45 on the shaft 24 whereby the conveyer becomes operatively connected to the driving mechanism of the blanching machine.

In the operation of this machine, the treated nuts enter the hopper 29 and are agitated to cause the same to pass through the orifice 30 and between the rolls 15, 16 and 17; assuming that the motor has been started, the rolls 15, 16 and 17 will be rotated; rolls 15 and 16 will rotate in an anticlockwise direction, (viewing Fig. 2) at a comparatively high rate of velocity while the roll 17 will rotate in a clockwise direction at a much lower rate of speed. Consequently the nuts will pass first between the rolls 15 and 17 and then the rolls 16 and 17, and as the roll 17 rotates at a much less speed than the other rolls, it is evident that the nuts will be dragged to a certain extent over the periphery of the roll 17 thuswise producing a rubbing action for removing the skins; the spongy surface of the roll accelerating the work. From the rolls 16 and 17, the nuts drop upon the periphery of the roll 25 which rotates in a clockwise direction (viewing Fig. 2). As the nuts strike the roll 25, there will be a tendency to separate the skins from the kernels, and the rotating roll 25 will have a tendency to cause the nuts to travel with the direction of rotation whereby they will be brought into the full influence of the suction of the pipe 26 due to the exhaust pump. Accordingly the light skins will be adapted to be lifted or drawn outwardly from the descending mass of kernels and exhausted. The kernels will then drop upon the conveyer 36 and be carried to some receptacle or the like.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A nut blanching machine comprising means for delivering nut kernels, three rolls having spongy peripheries in juxtaposed relation with each other said rolls defining a way therebetween for the passage of nut kernels from said means, said way comprising two portions, the first portion comprising a pair of said rolls, the second portion comprising the other roll and one of said pair, the rolls in each of said portions traveling in opposite directions and at different speeds.

2. A nut blanching machine comprising means for delivering nut kernels, three rolls having spongy peripheries in juxtaposed relation with each other said rolls defining a way therebetween for the passage of nut kernels from said means, said way comprising two portions, the first portion comprising a pair of said rolls, the second portion comprising the other roll and one of said pair, the rolls in each of said portions traveling in opposite directions and at different speeds, said second portion of said way directing said nut kernels to a mechanism for exhausting skins.

3. A nut blanching machine comprising means for delivering nut kernels, three rolls having spongy peripheries in juxtaposed relation with each other said rolls defining a way therebetween for the passage of nut kernels from said means, said way comprising two portions, the first portion comprising a pair of said rolls, the second portion comprising the other roll and one of said pair, the rolls in each of said portions traveling in opposite directions and at different speeds, said second portion of said way directing said nut kernels to a mechanism comprising a rotatable roll for exhausting skins.

4. A nut blanching machine comprising means for delivering nut kernels, three rolls having spongy peripheries in juxtaposed relation with each other said rolls defining a way therebetween for the passage of nut kernels from said means, said way comprising two portions, the first portion comprising a pair of said rolls, the second portion comprising the other roll and one of said pair, the rolls in each of said portions traveling in opposite directions and at different speeds, said second portion of said way directing said nut kernels to a mechanism comprising a perforated roll for exhausting skins.

5. A nut blanching machine comprising means for delivering nut kernels, three rolls having spongy peripheries in juxtaposed relation with each other said rolls defining a way therebetween for the passage of nut kernels from said means, said way comprising two portions, the first portion comprising a pair of said rolls, the second portion comprising the other roll and one of said pair, the rolls in each of said portions traveling in opposite directions and at different speeds, said second portion of said way directing said nut kernels to a mechanism comprising a blower for exhausting skins.

6. A nut blanching machine comprising means for delivering nut kernels, three rolls having spongy peripheries in juxtaposed relation with each other said rolls defining a way therebetween for the passage of nut kernels from said means, said way comprising two portions, the first portion comprising a pair of said rolls, the second portion comprising the other roll and one of said pair, the rolls in each of said portions traveling in opposite directions and at different speeds, said second portion of said way directing said nut kernels to a mechanism comprising a perforated roll, and a blower adjacent said perforated roll for exhausting skins.

In testimony whereof I have hereunto subscribed my name in the presence of two subscribing witnesses.

EUGENE J. REBECHINI.

Witnesses:
 FRED E. PAESLER,
 OSCAR HARTMANN.